United States Patent Office 3,012,356
Patented Dec. 12, 1961

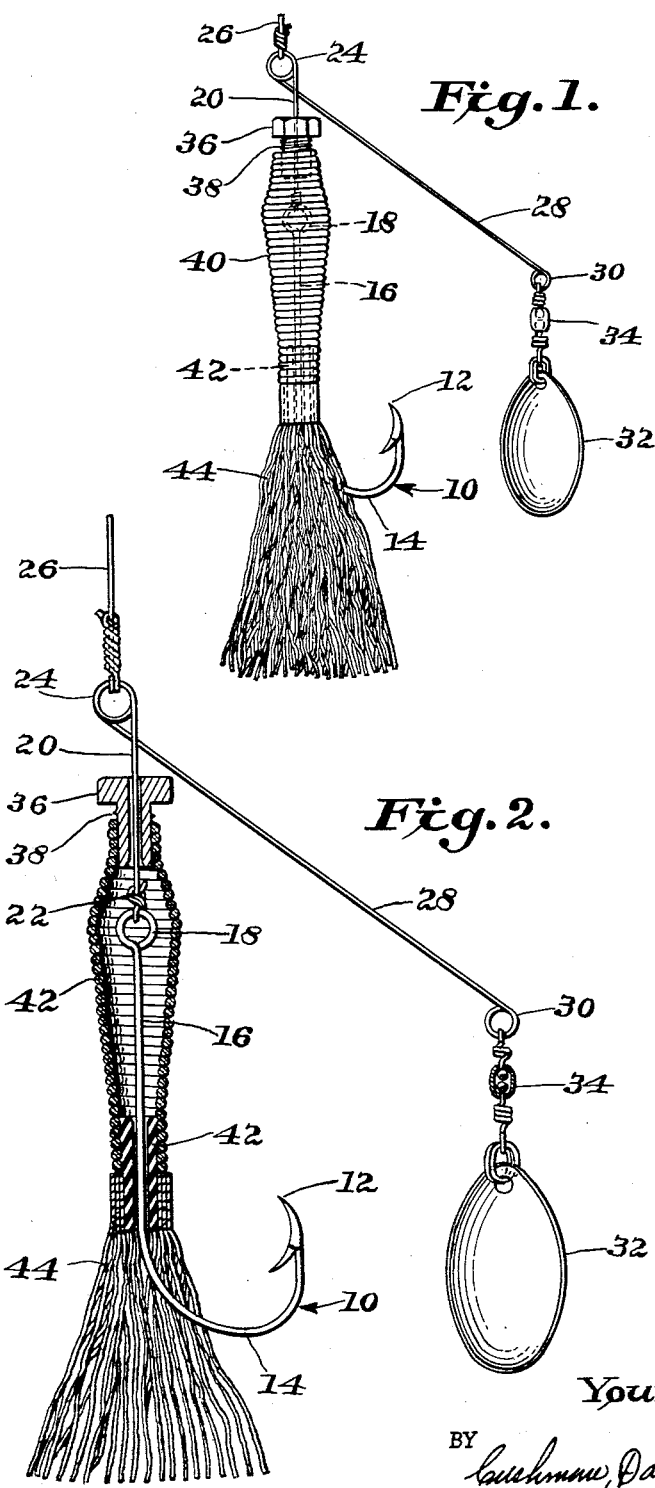

3,012,356
FISH LURE
Youree Tyson, Lake Charles, La.
(P.O. Box 491, Eunice, La.)
Filed Jan. 2, 1959, Ser. No. 784,525
2 Claims. (Cl. 43—42.11)

This invention relates to an improved fish lure of the trolling or casting type. More particularly, this invention relates to an artificial fish lure that lends itself to inexpensive manufacture, and yet is most effective for its intended purpose, i.e., to entice a game fish to strike, and is weedless.

It is a special object of this invention to provide an inexpensive fish lure of the type under consideration which will more effectively prevent a fish from "throwing the hook" while at the same time, enabling a fisherman to readily set the hook when a fish strikes the lure.

Other objects and advantages of the invention will become apparent from the following description and accompanying drawings, in which:

FIGURE 1 is a side elevational view of a fish lure embodying this invention.

FIGURE 2 is an enlarged longitudinal sectional view of the lure shown in FIGURE 1.

Referring now to the drawings there is shown a somewhat conventional hook 10 having a point 12, a bight portion 14, and an elongated shank 16 that terminates in an integral eyelet 18. A length 20 of stiff wire, preferably of stainless steel, has one end thereof looped through the shank eyelet 18 and then wrapped back upon itself, as at 22, in order to secure the length of the wire to the hook 10. In this connection, it will be noted that while the length of wire 20 is flexibly connected to the hook 10 so that the wire length can move angularly in substantially any direction relative to the hook shank 16, the wire length is not free to rotate relative to the hook shank. The reason for this construction will become apparent hereinafter.

The other end of the length of wire 20 is provided with one or more loops to provide an integral eyelet 24 that serves as a means for attaching the end of a fishing line 26 to the lure. Preferably, another length of wire 28 extends integrally from the loops forming the eyelet 24 and is inclined rearwardly at an acute angle to the wire length 20 in generally overlying relation to the point 12 of the hook, i.e., in generally the same plane as the bight portion 14 of the hook, in order to provide a weed guard. To make the lure even more attractive to game fish, the length 28 of wire preferably terminates in one or more additional loops to form an eyelet 30 to which a somewhat conventional concavo-convex metal spinner 32 is attached, preferably by a swivel connector 34. It will be seen that the spinner 32 is disposed generally laterally opposite the point 12 of the hook, but spaced sufficiently therefrom so as not to interfere with the hooking of a fish.

A metal bushing 36 is snugly but slidably mounted on the length 20 of the wire and may have an enlarged noncircular, e.g., hexagonal, forward portion, as shown in the drawings. The rear portion of the bushing 36 is reduced and may be provided with relatively coarse exterior threads 38. Threadedly engaged with the rear portion of the bushing 36 is a reduced forward portion of a coiled metal spring 40. The spring 40 may be securely fastened to the bushing 36 by being tightly threaded thereon as shown in the drawing, or in lieu of such a threaded connection the bushing may have a force-fit within the spring. Preferably, the bushing 36 and the spring 40 are made of brass, or may be of other metal that is chromium plated, so as to present a bright and attractive appearance for even more effectively inducing a game fish to strike the lure. Rearwardly of the bushing 36 the spring 40 is provided with an enlarged intermediate portion that generally surrounds the eyelet 18 on the shank 16 of the hook 10 and the loops 22 on the wire length 20. From its intermediate portion the spring 40 tapers in size generally rearwardly for an extended distance along the hook shank 16. Within its rearward end the spring 40 is provided with another metal bushing 42 of generally uniform diameter, that may be of lead or the like and is secured to the spring by being substantially threaded or force-fitted into the rear end thereof. This bushing 42 snugly but slidably engages the shank 16 of the hook and has a portion thereof extending rearwardly along the shank 16 of the hook exteriorly of the spring 40.

In order to render the lure even more attractive to a game fish, a somewhat conventional fringed rubber skirt 44 may have its forward neck portion secured, by a tight elastic grip on the rearwardly projecting portion of the bushing 42, so that the fringes of the skirt enclose a part of the shank 16 of the hook 10 and extend rearwardly thereof, as shown in the drawings.

From the aforedescribed construction it will be seen that when a fish strikes the lure, the wire length 20 and hook shank 16 generally will be in longitudinal alignment so that a straight line pull or jerk, without yielding, can be exerted by the fisherman on the hook 10 to "set" the latter and securely hook the fish. At the same time, however, it will be seen that the length of wire 20 can move angularly in substantially any direction with respect to the hook shank 16, although such movement is yieldably resisted by the spring 40. As is well known, a game fish on being hooked, frequently jumps and vigorously shakes its head in an effort to throw the hook. This shaking action is counteracted to a considerable extent, however, by the resilience of the spring 40 which permits the hook to be angularly positioned with respect to the direction of the pull of the line 26, while at the same time, tending to keep tension on the line so as to prevent the hook 10 from being "thrown."

It thus will be seen that the objects of this invention have been fully and effectively accomplished. It will be realized, however, that the foregoing specific embodiment has been shown and described only for the purpose of illustrating the principles of this invention and is subject to extensive change without departure from such principles. Therefore, this invention includes all modifications encompassed within the spirit and scope of the following claims.

I claim:

1. A fish lure comprising: a hook having a shank terminating in a free end; a length of stiff wire having one end thereof flexibly connected to the free end of the shank of said hook and the other end thereof provided with line-attaching means; an elongated coil spring forming a lure body enclosing the connection between said wire and shank and portions of said wire and shank on opposite sides of said connection, a bushing secured in the shank end of said spring and snugly but slidably engaging said shank portion, said bushing having a trailing portion projecting out of said spring; and a trailing skirt having its forward end enclosing and detachably secured about said trailing portion.

2. A fish lure comprising: an elongated coil spring forming a lure body, having its adjacent convolutions in contact, and tapering generally rearwardly from an enlarged forward head portion; a bushing of rigid material secured within the forward end of said spring; a length of stiff wire extending through said bushing and into said spring, the forward end of said wire terminating in a line-attaching loop; a hook having a shank terminating in an eyelet connected to the rearward end of said wire; a trailing skirt having its forward end detachably secured to the rearward end of said lure body; a second length of wire extending integrally from said loop and inclined rearwardly therefrom; and a spinner swivelly connected to the rear end of said second length of wire.

References Cited in the file of this patent

UNITED STATES PATENTS

| | | |
|---|---|---|
| 716,451 | Mantz | Dec. 23, 1902 |
| 1,419,540 | Brown | June 13, 1922 |
| 1,974,381 | Swanson et al. | Sept. 18, 1934 |
| 1,989,850 | Dorsey | Feb. 5, 1935 |
| 2,098,095 | Hoefler | Nov. 2, 1937 |
| 2,203,473 | Shannon | June 4, 1940 |
| 2,435,730 | Worden | Feb. 10, 1948 |
| 2,589,117 | Oberbeck et al. | Mar. 11, 1952 |
| 2,750,703 | Puste | June 19, 1956 |
| 2,808,678 | Leonard | Oct. 8, 1957 |
| 2,871,612 | Mohan | Feb. 3, 1959 |